United States Patent
Utsumi

(10) Patent No.: US 11,135,912 B2
(45) Date of Patent: Oct. 5, 2021

(54) DUMP BODY AND DUMP TRUCK

(71) Applicant: Komatsu Ltd., Tokyo (JP)

(72) Inventor: Masahiro Utsumi, Tokyo (JP)

(73) Assignee: Komatsu Ltd., Tokyo (JP)

( * ) Notice: Subject to any disclaimer, the term of this patent is extended or adjusted under 35 U.S.C. 154(b) by 426 days.

(21) Appl. No.: 16/097,685

(22) PCT Filed: Jul. 3, 2018

(86) PCT No.: PCT/JP2018/025246
§ 371 (c)(1),
(2) Date: Oct. 30, 2018

(87) PCT Pub. No.: WO2018/203578
PCT Pub. Date: Nov. 8, 2018

(65) Prior Publication Data
US 2021/0221220 A1     Jul. 22, 2021

(51) Int. Cl.
*B60K 13/04* (2006.01)
*B60P 1/04* (2006.01)

(52) U.S. Cl.
CPC ............... *B60K 13/04* (2013.01); *B60P 1/04* (2013.01)

(58) Field of Classification Search
CPC .................................... B60K 13/04; B60P 1/04
See application file for complete search history.

(56) References Cited

U.S. PATENT DOCUMENTS

| | | | |
|---|---|---|---|
| 8,721,006 B2 | 5/2014 | Uranaka | |
| 2013/0187435 A1* | 7/2013 | Uranaka | B60P 1/28 298/17 R |
| 2016/0201543 A1* | 7/2016 | Ashikawa | B60P 1/04 180/309 |
| 2016/0257194 A1* | 9/2016 | Ashikawa | B60P 1/04 |
| 2018/0361848 A1* | 12/2018 | Kesani | F01N 13/082 |
| 2020/0125104 A1* | 4/2020 | Kuriyagawa | A01D 34/71 |
| 2021/0122430 A1* | 4/2021 | Holthaus | B62D 23/005 |

FOREIGN PATENT DOCUMENTS

| | | |
|---|---|---|
| CA | 2882564 A1 | 2/2014 |
| JP | S63-89337 U | 6/1988 |
| JP | H04-130534 U | 11/1992 |
| JP | 10-016631 A | 1/1998 |
| JP | 2007-137108 A | 6/2007 |
| JP | 2013-086635 A | 5/2013 |

OTHER PUBLICATIONS

International Search Report dated Sep. 4, 2018, issued for PCT/JP2018/025246.
Office Action dated Sep. 5, 2019, issued in the corresponding Canadian patent application No. 3,021,894.

* cited by examiner

*Primary Examiner* — Erez Gurari
(74) *Attorney, Agent, or Firm* — Locke Lord LLP

(57) ABSTRACT

A dump body includes: a side plate; an exterior plate which is arranged on an outer surface side of the side plate; a suspension member which is fixed to the side plate and has a through-hole connecting a space on an inner surface side of the side plate and a space on an outer surface side of the exterior plate; a flow path which is defined in at least a part between the side plate and the exterior plate and through which an exhaust gas of an engine flows; and a heat insulation member which is arranged between the side plate and the exterior plate, the heat insulation member being configured to suppress contact between the exhaust gas and the suspension member.

10 Claims, 8 Drawing Sheets

DUMP BODY AND DUMP TRUCK

FIELD

The present invention relates to a dump body and a dump truck.

BACKGROUND

A dump truck has a dump body on which a cargo is loaded. When the cargo is discharged from the dump body, the dump truck causes the dump body to erect. When the dump body erects, the cargo is discharged from the dump body by action of gravity. When the cargo is moist, there is a case where at least a part of the cargo is kept in the state of being attached to an inner surface of the dump body so that the cargo is not discharged from the dump body even if the dump body erects. In order to prevent the cargo from adhering to the dump body, there is known a technique of causing an exhaust gas discharged from an engine of the dump truck to flow through a flow path provided in the dump body. As the high-temperature exhaust gas flows through the flow path of the dump body, the dump body is heated by the exhaust gas so that the cargo is dried. As a result, the cargo is prevented from adhering to the dump body.

CITATION LIST

Patent Literature

Patent Literature 1: Japanese Patent Application Laid-Open No. 2013-086635 A

SUMMARY

Technical Problem

In the dump body, the flow path of the exhaust gas may be provided in a strength member such as a rib. In addition, there is a case where a suspension member used when suspending the dump body is also provided in the strength member of the dump body. When both the flow path and the suspension member are provided in the strength member of the dump body, there is a possibility that the flow of the exhaust gas flowing through the flow path may be disturbed by the suspension member. If the flow of the exhaust gas is disturbed, there occurs a phenomenon where heat transferred from the exhaust gas to the surface of the dump body increases. Since the exhaust gas flowing through the flow path is at high temperature, there is a possibility that the surface of the dump body is excessively heated if the flow of the exhaust gas is disturbed. As a result, there is a possibility that the surface of the dump body may be burned and discolored. When the surface of the dump body is discolored, an appearance of the dump body deteriorates.

An aspect of the present invention is to suppress deterioration of an appearance of a dump body caused by heat of an exhaust gas.

Solution to Problem

According to an aspect of the present invention, a dump body comprises: a side plate; an exterior plate which is arranged on an outer surface side of the side plate; a suspension member which is fixed to the side plate and has a through-hole connecting a space on an inner surface side of the side plate and a space on an outer surface side of the exterior plate; a flow path which is defined in at least a part between the side plate and the exterior plate and through which an exhaust gas of an engine flows; and a heat insulation member arranged between the side plate and the exterior plate, the heat insulation member being configured to suppress contact between the exhaust gas and the suspension member.

Advantageous Effects of Invention

According to an aspect of the present invention, it is possible to prevent the deterioration of the appearance of the dump body caused by the heat of the exhaust gas.

DESCRIPTION OF EMBODIMENTS

Hereinafter, embodiments of the present invention will be described with reference to the drawings, but the present invention is not limited thereto. Constituent elements of the embodiments to be described below can be appropriately combined. In addition, some constituent elements are not used in some cases.

In the embodiments to be described below, an XYZ orthogonal coordinate system is set, and a positional relationship of each unit will be described with reference to the XYZ orthogonal coordinate system. A direction parallel to an X axis in a predetermined plane is defined as an X-axis direction, a direction parallel to a Y axis in the predetermined plane orthogonal to the X axis is defined as a Y-axis direction, and a direction parallel to a Z axis orthogonal to the predetermined plane is defined as a Z-axis direction. In the embodiment, it is assumed that the XY plane and the horizontal plane are parallel.

The X-axis direction indicates the left-right direction, the Y-axis direction indicates the front-rear direction, and the Z-axis direction indicates the up-down direction. The left-right direction is a direction parallel to a rotation axis of a wheel in which the dump truck is not steered, and is synonymous with a vehicle width direction. The up-down direction means a direction orthogonal to a contact surface of a tire of the dump truck contacting the ground. The front-rear direction is a direction orthogonal to the left-right direction and the up-down direction. A +X direction is the right direction, and a −X direction is the left direction. A +Y direction is the forward direction, and the −Y direction is the rearward direction. A +Z direction is the upward direction, and a −Z direction is the downward direction.

In the X-axis direction, a direction of separating from a center of the dump truck or a position far from the center of the dump truck will be appropriately referred to as an outer surface side or an outer side in the vehicle width direction, and a direction approaching the center of the dump truck or a position close to the center of the dump truck will be appropriately referred to as an inner surface side or an inner side in the vehicle width direction.

First Embodiment

[Dump Truck]

Figure 1:
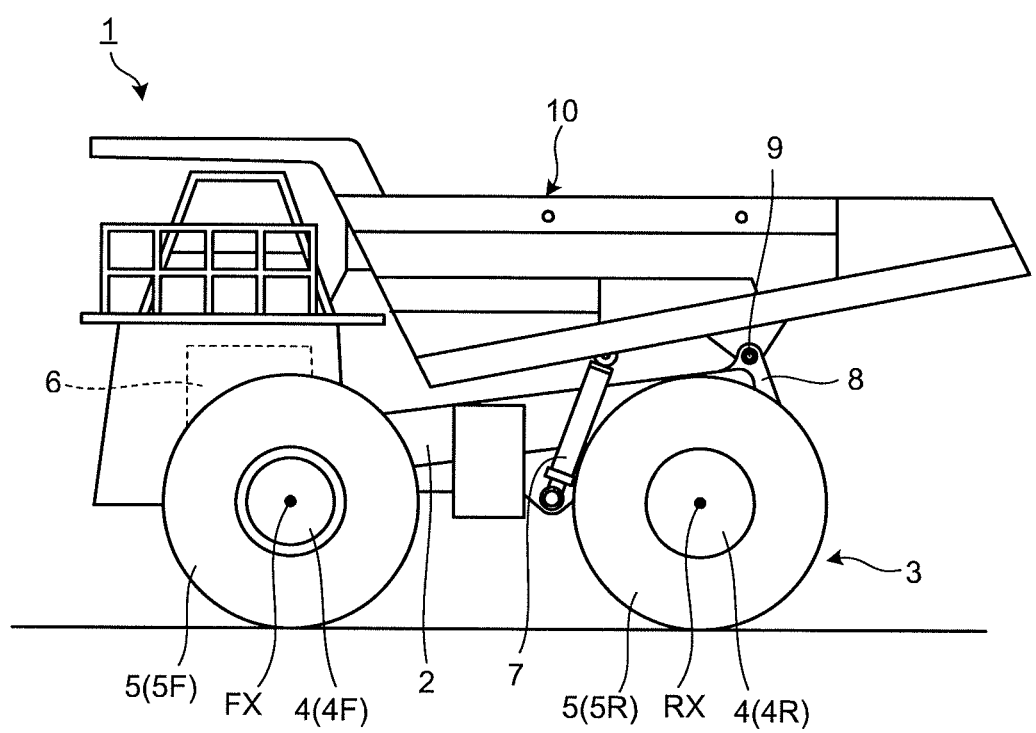
FIG. 1 is a view schematically illustrating a dump truck according to a first embodiment.
Figure 1:
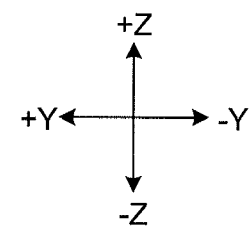

FIG. 1 is a view schematically illustrating a dump truck 1 according to the present embodiment. The dump truck 1 is a self-propelled off-road dump truck that operates at a mining site of a mine. The dump truck 1 is a rigid frame type.

As illustrated in FIG. 1, the dump truck 1 includes a dump body 10, a vehicle body 2 supporting the dump body 10, a traveling device 3 that travels while supporting the vehicle body 2, an engine 6 that generates power, a hoist cylinder 7 that derricks the dump body 10.

A cargo is loaded on the dump body 10. The dump truck 1 is a rear dump type and discharges the cargo from the dump body 10 by tilting the dump body 10 rearward. The dump body 10 is connected to a bracket 8 of the vehicle body 2 via a rotation pin 9. A lower part of the rear portion of the dump body 10 and the bracket 8 are connected. The dump body 10 is rotatable about the rotation pin 9. A rotation axis of the dump body 10 is parallel to the X axis.

The dump body 10 is derricked by rotating about the rotation pin 9 and can change to at least one of a loading posture and an upright posture. The loading posture refers to a posture in which the dump body 10 is lowered to approach the vehicle body 2 the most in a movable range of the dump body 10 and seated on the vehicle body 2. The upright posture refers to a posture in which the dump body 10 rises to be away farthest from the vehicle body 2 in the movable range of the dump body 10. In the loading posture of the dump body 10, a cargo is loaded on the dump body 10, and the dump truck 1 can travel. In the upright posture of the dump body 10, the cargo is discharged from the dump body 10.

The hoist cylinder 7 is arranged between the vehicle body 2 and the dump body 10. The dump body 10 is adjusted to at least one of the loading posture and the upright posture by power generated by the hoist cylinder 7.

The traveling device 3 has wheels 4. Tires 5 are mounted to the wheels 4. As the wheel 4 rotates, the dump truck 1 travels. The wheel 4 includes a front wheel 4F rotating about a rotation axis FX and a rear wheel 4R rotating about a rotation axis RX. The tires 5 include a front tire 5F mounted on the front wheel 4F and a rear tire 5R mounted on the rear wheel 4R. Further, the traveling device 3 has a steering device for changing the direction of the front wheel 4F. The rear wheel 4R is not steered. The X-axis direction is a direction parallel to the rotation axis RX of the rear wheel 4R.

The engine 6 is provided on the vehicle body 2. The engine 6 includes an internal combustion engine such as a diesel engine. The engine 6 burns fuel to generate power. As the fuel burns, an exhaust gas is discharged from the engine 6.

The traveling device 3 is operated by the power generated by the engine 6. The power generated by the engine 6 is transmitted to the rear wheel 4R. As the rear wheel 4R rotates, the traveling device 3 travels.

[Dump Body]

Figure 2:
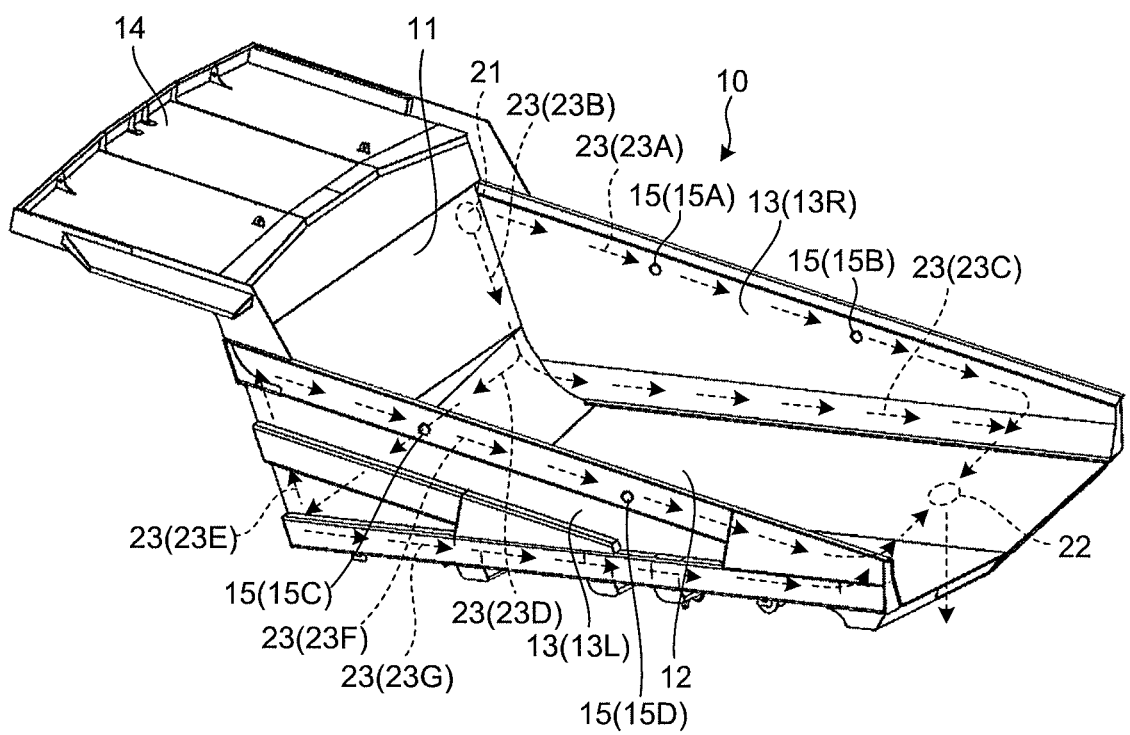
FIG. 2 is a perspective view illustrating a dump body according to the first embodiment.
Figure 2:
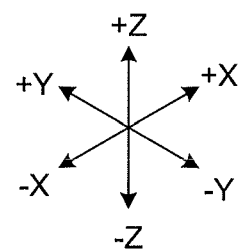

FIG. 2 is a perspective view illustrating the dump body 10 according to the present embodiment. As illustrated in FIG. 2, the dump body 10 includes a front plate 11, a bottom plate 12 connected to a lower end portion of the front plate 11, side plates 13 connected to right and left end portions of the front plate 11 and right and left end portions of the bottom plate 12, and a protector plate 14 connected to an upper end portion of the front plate 11.

The front plate 11, the bottom plate 12, the side plates 13, and the protector plate 14 are integrated. The front plate 11, the bottom plate 12, the side plates 13, and the protector plate 14 are made of a steel material.

In the loading posture of the dump body 10, the protector plate 14 is arranged above a cab of the vehicle body 2. A rear end portion of the protector plate 14 and the upper end portion of the front plate 11 are connected. The lower end portion of the front plate 11 and a front end portion of the bottom plate 12 are connected.

The side plates 13 are arranged on the right side (+X side) and on the left side (−X side) of the center of the dump body 10 in the left-right direction. The side plate 13 includes a right side plate 13R, arranged on the right side of the center of the dump body 10 and connected to each of the right end portion of the front plate 11 and the right end portion of the bottom plate 12, and a left side plate 13L arranged on the left side of the center of the dump body 10 and connected to each of the left end portion of the front plate 11 and the left end portion of the bottom plate 12.

The front plate 11 has a front surface facing the front side (+Y direction) and a rear surface facing a direction opposite to the front surface. The bottom plate 12 has a bottom surface facing the upper side (+Z direction) and a lower surface facing a direction opposite to the bottom surface.

The side plate 13 has an inner surface facing a side of the center of the dump body 10 in the left-right direction and an outer surface facing a direction opposite to the inner surface.

In the dump body 10, a loading space in which the cargo is loaded is defined between the rear surface of the front plate 11, the bottom surface of the bottom plate 12, and the inner surface of the side plate 13.

The dump body 10 has an inlet port 21 into which the exhaust gas of the engine 6 is introduced, a flow path 23 through which the exhaust gas flows, and an exhaust port 22 from which the exhaust gas is discharged. In the flow path 23, a side of the inlet port 21 is synonymous with the upstream side of the exhaust gas, and a side of the exhaust port 22 is synonymous with the downstream side of the exhaust gas.

The inlet port 21 is provided on the front surface of the front plate 11. The inlet port 21 is provided at an upper right portion of the front surface of the front plate 11. Incidentally, the inlet port 21 may be provided in the central portion of the front surface in the left-right direction.

The vehicle body 2 has a conduit that guides the exhaust gas discharged from the engine 6 to the inlet port 21. In the loading posture of the dump body 10, an outlet of the conduit and the inlet port 21 are connected. In the loading posture of the dump body 10, the exhaust gas of the engine 6 is supplied to the inlet port 21. In the upright posture of the dump body 10, the outlet of the conduit and the inlet port 21 are separated. In the upright posture of the dump body 10, the exhaust gas of the engine 6 is discharged from the outlet of the conduit.

The exhaust port 22 is provided on a lower surface of the bottom plate 12. The exhaust port 22 is provided at arear portion of the lower surface of the bottom plate 12. Incidentally, the exhaust port 22 may be provided at a rear portion of the side plate 13.

The flow path 23 is provided inside the dump body 10. At least a part of the flow path 23 is provided in the side plate 23. The exhaust gas discharged from the engine 6 flows into the flow path 23 from the inlet port 21. The exhaust gas flowing through the flow path 23 is discharged from the exhaust port 22.

The flow path 23 includes a first flow path 23A provided at an upper end portion of the right side plate 13R, a second flow path 23B provided at a boundary between the front plate 11 and the right side plate 13R, a third flow path 23C provided at a lower end portion of the right side plate 13R, a fourth flow path 23D provided at a boundary between the front plate 11 and the bottom plate 12, a fifth flow path 23E provided at a boundary between the front plate 11 and the left side plate 13L, a sixth flow path 23F provided at an upper end portion of the left side plate 13L, and a seventh flow path 23G provided at a lower end portion of the left side plate 13L.

Each of the upper end portion and the lower end portion of the right side plate 13R includes a strength member such as a rib. Each of the upper end portion and the lower end portion of the left side plate 13L includes a strength member such as a rib. The first flow path 23A, the third flow path 23C, the sixth flow path 23F, and the seventh flow path 23G are provided in the strength member of the dump body 10.

The first flow path 23A extends in the Y-axis direction at the upper end portion of the right side plate 13R. The first flow path 23A may be inclined with respect to the Y-axis direction. A front end portion of the first flow path 23A is connected to the inlet port 21. The exhaust gas flowing into the first flow path 23A from the inlet port 21 flows through the first flow path 23A toward a rear end portion of the first flow path 23A.

The second flow path 23B is provided at the boundary between the front plate 11 and the right side plate 13R. The second flow path 23B is inclined in the −Y direction toward the −Z direction. An upper end portion of the second flow path 23B is connected to the inlet port 21. The exhaust gas flowing into the second flow path 23B from the inlet port 21 flows through the second flow path 23B toward a lower end portion of the second flow path 23B.

The third flow path 23C is provided at the lower end portion of the right side plate 13R. The third flow path 23C is inclined in the +Z direction toward the −Y direction. A front end portion of the third flow path 23C is connected to the lower end portion of the second flow path 23B. The exhaust gas flowing from the second flow path 23B into the third flow path 23C flows through the third flow path 23C toward a rear end portion of the third flow path 23C.

The fourth flow path 23D extends in the X-axis direction at the boundary between the front plate 11 and the bottom plate 12. A right end portion of the fourth flow path 23D is connected to the lower end portion of the second flow path 23B. The exhaust gas flowing from the second flow path 23B into the fourth flow path 23D flows through the fourth flow path 23D toward a left end portion of the fourth flow path 23D.

The fifth flow path 23E is provided at the boundary between the front plate 11 and the left side plate 13L. The fifth flow path 23E is inclined in the +Y direction toward the +Z direction. A lower end portion of the fifth flow path 23E is connected to the left end portion of the fourth flow path 23D. The exhaust gas flowing from the fourth flow path 23D into the fifth flow path 23E flows through the fifth flow path 23E toward an upper end portion of the fifth flow path 23E.

The sixth flow path 23F extends in the Y-axis direction at the upper end portion of the left side plate 13L. The sixth flow path 23F may be inclined with respect to the Y-axis direction. A front end portion of the sixth flow path 23F is connected to the upper end portion of the fifth flow path 23E. The exhaust gas flowing from the fifth flow path 23E to the sixth flow path 23F flows through the sixth flow path 23F toward a rear end portion of the sixth flow path 23F.

The seventh flow path 23G is provided at the lower end portion of the left side plate 13L. The seventh flow path 23G is inclined in the +Z direction toward the −Y direction. A front end portion of the seventh flow path 23G is connected to the left end portion of the fourth flow path 23D. The exhaust gas flowing from the fourth flow path 23D into the seventh flow path 23G flows through the seventh flow path 23G toward a rear end portion of the seventh flow path 23G.

Each of the rear end portion of the first flow path 23A, the rear end portion of the third flow path 23C, the rear end portion of the sixth flow path 23F, and the rear end portion of the seventh flow path 23G is connected to the exhaust port 22 via the flow path provided on the lower surface of the bottom plate 12. The exhaust gas flowing through the flow path 23 is discharged from the exhaust port 22 to the lower side of the bottom plate 12.

The exhaust gas supplied from the engine 6 to the inlet port 21 is branched into the first flow path 23A and the second flow path 23B. As a result, an exhaust resistance of the engine 6 is reduced, and deterioration of the fuel consumption rate of the engine 6 is suppressed.

The side plate 13 has a plurality of openings 15. The opening 15 is a through-hole penetrating through an inner surface and an outer surface of the side plate 13. The opening 15 is circular. The opening 15 is provided in an upper end portion of the side plate 13. The opening 15 includes a first opening 15A provided in the upper end portion of the right side plate 13R, a second opening 15B provided in the upper end portion of the right side plate 13R at the rear of the first opening 15A, a third opening 15C provided in the upper end portion of the left side plate 13L, and a fourth opening 15D provided in the upper end portion of the left side plate 13L at the rear of the third opening 15C. A position of the first opening 15A coincides with a position of the third opening 15C in the Y-axis direction. A position of the second opening 15B coincides with a position of the fourth opening 15D in the Y-axis direction.

Figure 3:
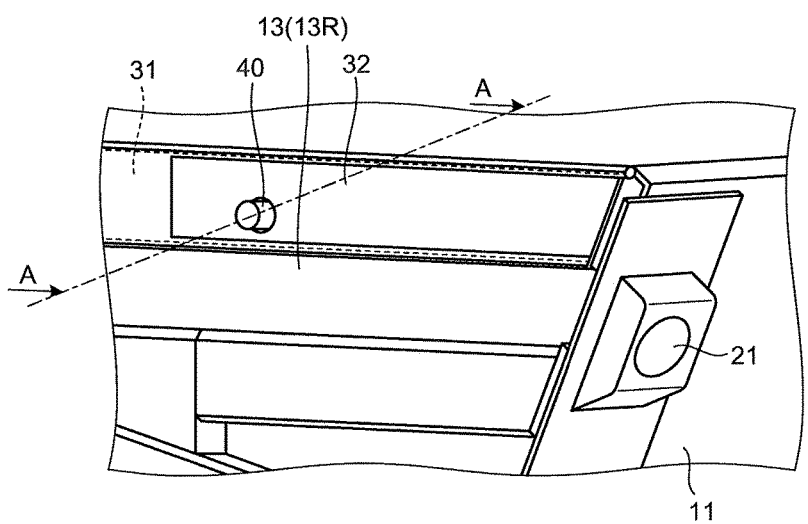
FIG. 3 is a perspective view illustrating a part of the dump body according to the first embodiment.
Figure 3:
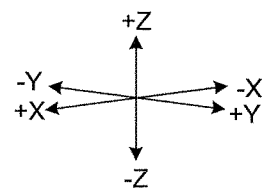
Figure 4:
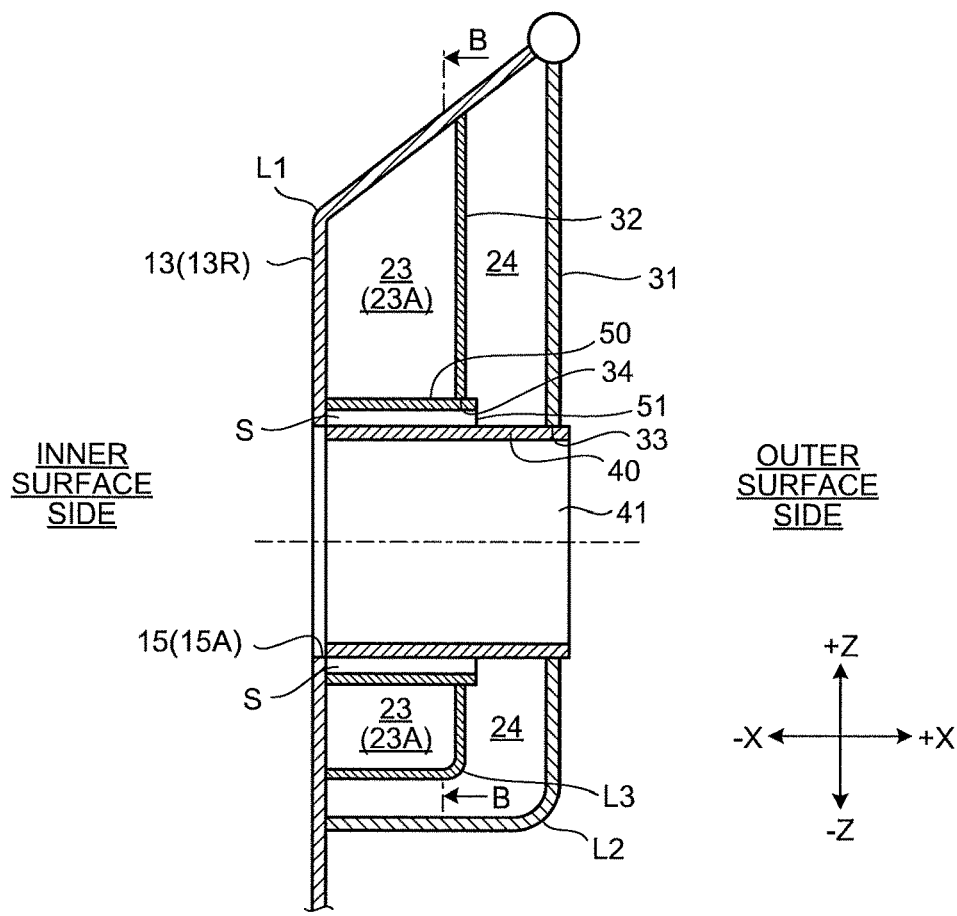
FIG. 4 is a cross-sectional view illustrating a part of the dump body according to the first embodiment.
Figure 5:
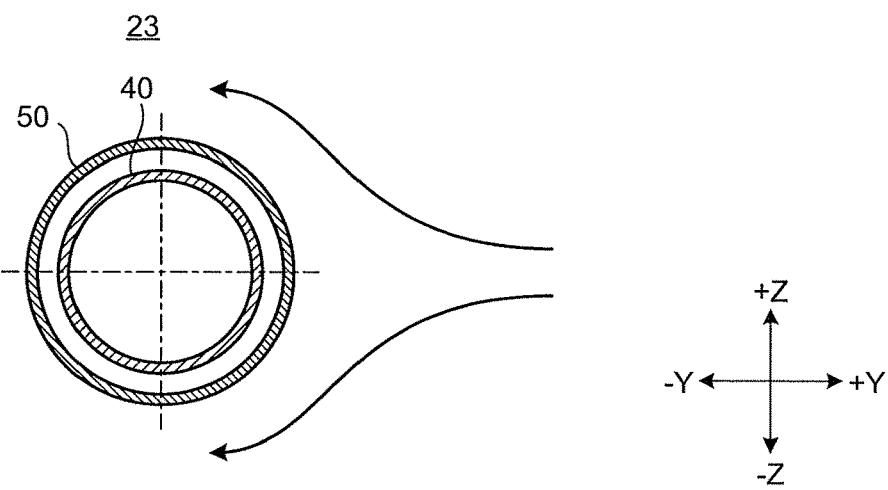
FIG. 5 is a view illustrating a part of the dump body according to the first embodiment.

FIG. 3 is a perspective view illustrating a part of the dump body 10 according to the present embodiment, and is a view of the vicinity of the inlet port 21 and the first opening 15A as viewed from the front right side. FIG. 4 is a cross-sectional view illustrating a part of the dump body 10 according to the present embodiment and corresponds to a cross-sectional view taken along the line A-A in FIG. 3. FIG. 5 is a view illustrating a part of the dump body according to the present embodiment and corresponds to a view taken along the line B-B in FIG. 4. In the examples illustrated in FIGS. 3, 4, and 5, the side plate 13 is the right side plate 13R, the opening 15 is the first opening 15A, and the flow path 23 is the first flow path 23A.

As illustrated in FIGS. 3, 4, and 5, the dump body 10 includes: the side plate 13; an exterior plate 31 arranged on the outer surface side of the side plate 13; a suspension member 40 fixed to the side plate 13 and having a through-hole 41 that connects a space on the inner surface side of the side plate 13 and a space on the outer surface side of the exterior plate 31 via the opening 15; the flow path 23 which is defined in at least a part between the side plate 13 and the exterior plate 31 and through which the exhaust gas of the engine 6 flowing from the inlet port 21 flows; a heat insulation member 50 arranged between the side plate 13 and the exterior plate 31 to suppress contact between the exhaust gas flowing through the flow path 23 and the suspension member 40; and a partition plate 32 fixed to the heat insulation member 50 and arranged between the side plate 13 and the exterior plate 31.

Incidentally, FIG. 3 illustrates a state where the exterior plate 31 is removed from the side plate 13. In FIG. 3, the exterior plate 31 is illustrated in an imaginary line (dotted line).

The side plate 13 has an outer surface facing the outer side in the vehicle width direction and an inner surface facing the inner side in the vehicle width direction. A part of the side plate 13 is bent, and a bent portion L1 is provided in the side plate 13. The side plate 13 above the bent portion L is inclined outward in the vehicle width direction toward the upper side. Each of the inner surface and the outer surface of the side plate 13 below the bent portion L1 is substantially orthogonal to the X axis.

The suspension member 40 is a member used when suspending the dump body 10. For example, when the dump body 10 is removed from the vehicle body 2 or placed on the vehicle body 2, a wire passes through the opening 15 and the through-hole 41. As the wire is pulled up by a crane, the dump body 10 is suspended by the crane.

The suspension member 40 is a cylindrical member having the through-hole 41. The suspension member 40 is made of a steel material. The through-hole 41 penetrates through an end portion on an outer surface side and an end portion on an inner surface side of the suspension member 40. A central axis of the suspension member 40 is parallel to the X axis.

The suspension member 40 is arranged in a space on the outer surface side of the side plate 13. The end portion on the inner surface side of the suspension member and the outer surface of the side plate 13 are fixed. The suspension member 40 is connected to the outer surface of the side plate 13 by welding.

The heat insulation member 50 is a cylindrical member having a through-hole 51. The heat insulation member 50 is made of a steel material. The through-hole 51 penetrates through an end portion on an outer surface side and an end portion on an inner surface side of the heat insulation member 50. A central axis of the heat insulation member 50 is parallel to the X axis.

The heat insulation member 50 is arranged in a space on the outer surface side of the side plate 13. The heat insulation member 50 is arranged between the side plate 13 and the exterior plate 31 in the X-axis direction. The end portion on the inner surface side of the heat insulation member 50 and the outer surface of the side plate 13 are fixed. The heat insulation member 50 is connected to the outer surface of the side plate 13 by welding.

An inner diameter of the heat insulation member 50 is larger than an outer diameter of the suspension member 40. At least a part of the suspension member 40 is arranged in the through-hole 51 of the heat insulation member 50. The heat insulation member 50 is arranged around the suspension member 40. As illustrated in FIG. 5, the heat insulation member 50 is arranged on the inlet port 21 side (+Y side) of the suspension member 40, on the upper side (+Z side) of the suspension member 40, on the exhaust port 22 side (−Y side) of the suspension member 40, and on the lower side (−Z side) of the suspension member 40. The heat insulation member 50 is away from the suspension member 40. An inner circumferential surface of the heat insulation member 50 and an outer circumferential surface of the suspension member 40 oppose each other with a gap therebetween.

Regarding the gap between the inner circumferential surface of the heat insulation member 50 and the outer circumferential surface of the suspension member 40, a radial gap dimension is uniform over the entire circumference. As illustrated in FIG. 5, at least a part of the heat insulation member 50, which is the part on the inlet port 21 side (+Y side) of the suspension member and on the upstream side of the exhaust gas, is arranged on the upstream side of the suspension member 40 in the flow path 23.

The suspension member 40 is fixed to the side plate 13 such that a center of the through-hole 41 coincides with a center of the opening 15 in a plane orthogonal to the central axis of the suspension member 40. In addition, the heat insulation member 50 is fixed to the side plate 13 such that the center of the through-hole 41 coincides with a center of the through-hole 51 in a plane orthogonal to the central axis of the heat insulation member 50. The suspension member 40 and the heat insulation member 50 are connected to the side plate 13 such that the center of the opening 15, the center of the through-hole 41, and the center of the through-hole 51 coincide with each other.

A dimension of the suspension member 40 is larger than a dimension of the heat insulation member 50 in a direction in which the central axis of the suspension member 40 extends. In a state where each of an end portion on the inner surface side of the suspension member 40 and an end portion on the inner surface side of the heat insulation member 50 is connected to the outer surface of the side plate 13, an end portion on the outer surface side of the suspension member 40 is arranged on the outer side in the vehicle width direction of an end portion on the outer surface side of the heat insulation member 50.

The exterior plate 31 is arranged on the outer surface side of the side plate 13. The exterior plate 31 is made of a steel material. A part of the exterior plate 31 is bent, and a bent portion L2 is provided in the exterior plate 31. The exterior plate 31 below the bent portion L2 is bent inward in the vehicle width direction. Each of an inner surface and an outer surface of the exterior plate 31 above the bent portion L2 is substantially perpendicular to the X axis.

Each of an upper end portion and a lower end portion of the exterior plate 31 is fixed to the side plate 13. The outer surface of the side plate 13 and the inner surface of the exterior plate 31 are away from each other. A space is formed between the side plate 13 and the exterior plate 31. As the exterior plate 31 is fixed to the side plate 13, a strength member such as a rib is formed in the upper end portion of the side plate 13. The outer surface of the exterior plate 31 forms at least a part of the surface of the dump body 10.

The exterior plate 31 has an opening 33 in which the suspension member 40 is arranged. The outer circumferential surface of the suspension member 40 and an inner circumferential surface of the opening 33 are fixed to each other. The suspension member 40 is connected to the inner circumferential surface of the opening 33 of the exterior plate 31 by welding. The end portion on the outer surface side of the suspension member 40 is arranged on the outer side in the vehicle width direction of the outer surface of the exterior plate 31.

The heat insulation member 50 is away from the exterior plate 31 toward the inner surface side. The heat insulation member 50 and the exterior plate 31 do not contact each other.

The partition plate 32 is arranged on the outer surface side of the side plate 13. The partition plate 32 is made of a steel material. A part of the partition plate 32 is bent, and a bent portion L3 is provided in the partition plate 32. The partition plate 32 below the bent portion L3 is bent inward in the vehicle width direction. Each of an inner surface and an outer surface of the partition plate 32 above the bent portion L3 is substantially perpendicular to the X axis. A lower end portion of the partition plate 32 is arranged above the lower end portion of the exterior plate 31.

At least a part of the partition plate 32 is arranged between the side plate 13 and the exterior plate 31 in the X-axis direction. Each of an upper end portion and the lower end portion of the partition plate 32 is fixed to the side plate 13. The outer surface of the side plate 13 and the inner surface of the partition plate 32 are away from each other. The outer surface of the partition plate 32 and the inner surface of the exterior plate 31 are away from each other. A space is formed between the side plate 13 and the partition plate 32. A space is formed between the partition plate 32 and the exterior plate 31.

The partition plate 32 has an opening 34 in which the heat insulation member 50 is arranged. An outer circumferential surface of the heat insulation member 50 and an inner circumferential surface of the opening 34 are fixed. The heat insulation member 50 is connected to the inner circumferential surface of the opening 34 of the partition plate 32 by welding. The end portion on the outer surface side of the heat insulation member 50 is arranged on the outer side in the vehicle width direction of the outer surface of the partition plate 32.

The flow path 23 includes a space between the side plate 13 and the partition plate 32. The flow path 23 is defined between the side plate 13 and the exterior plate 31 in the X-axis direction. The flow path 23 is defined by the outer surface of the side plate 13, the outer circumferential surface of the heat insulation member 50, and the inner surface of the partition plate 32.

The exhaust gas does not flow through the space between the partition plate 32 and the exterior plate 31. The suspension member 40 is arranged in the through-hole 51 of the heat insulation member 50. The heat insulation member 50 suppresses the contact between the exhaust gas flowing through the flow path 23 and the suspension member 40. The exhaust gas flowing through the flow path 23 does not contact the suspension member 40.

[Manufacturing Method]

Figure 6:
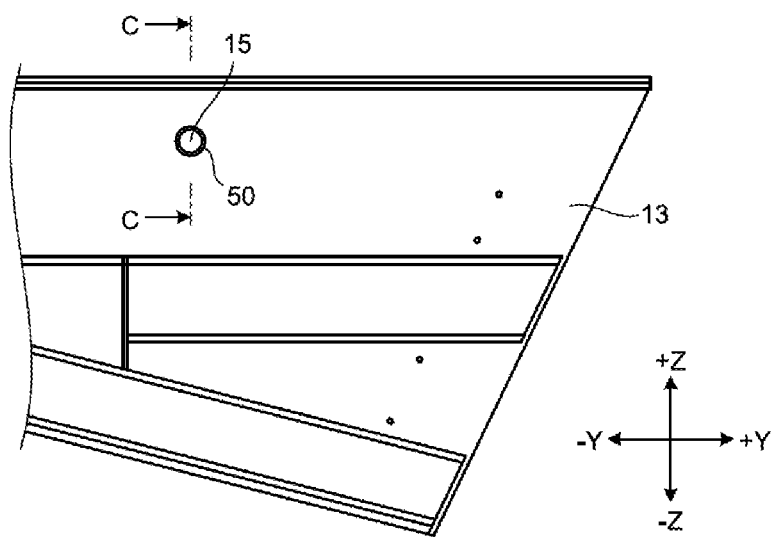
FIG. 6(A) and FIG. 6(B) are views illustrating a method for manufacturing the dump body according to the first embodiment.
Figure 6:
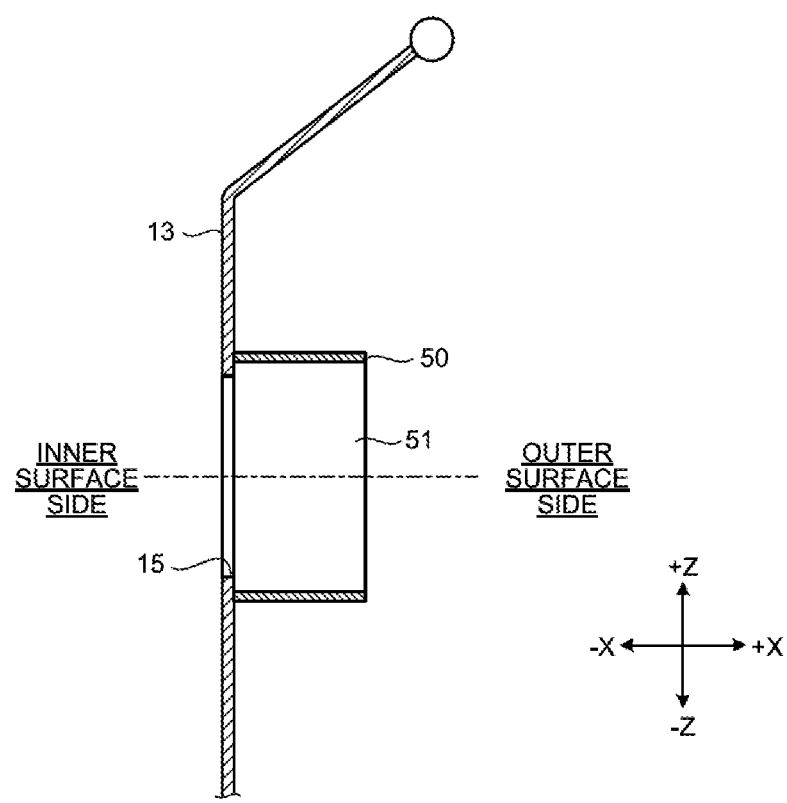
Figure 7:
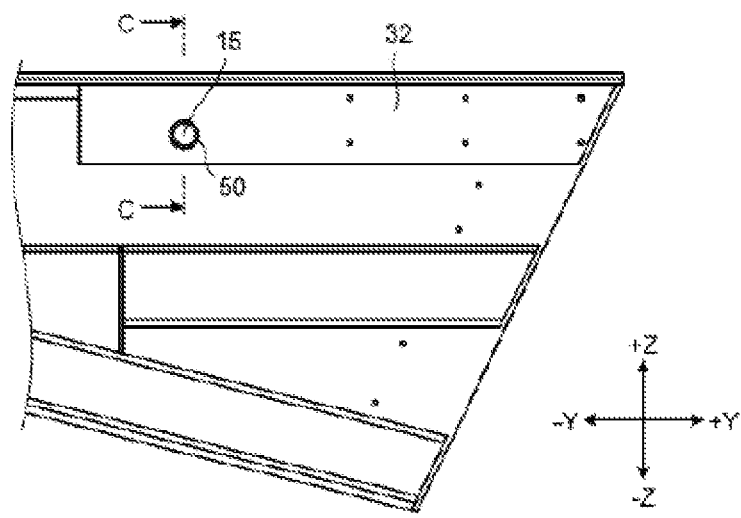
FIG. 7(A) and FIG. 7(B) are views illustrating a method for manufacturing the dump body according to the first embodiment.
Figure 7:
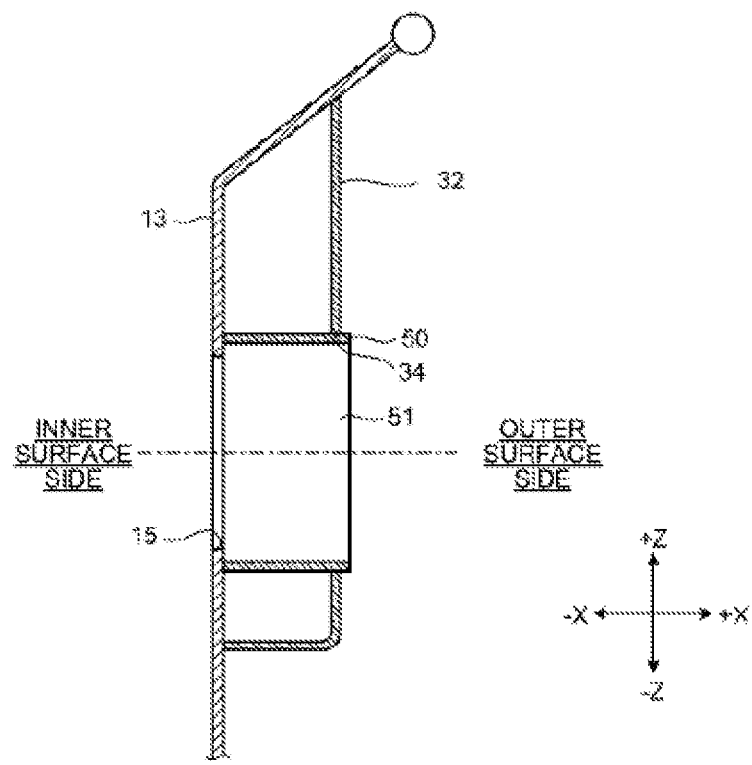
Figure 8:
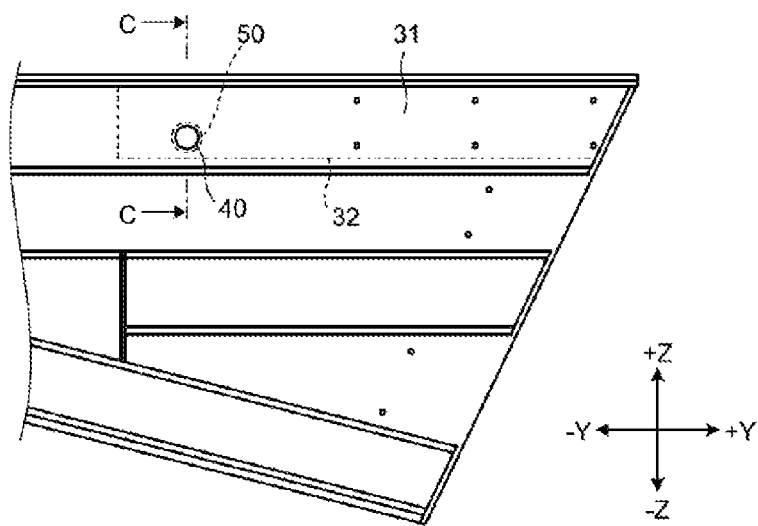
FIG. 8(A) and FIG. 8(B) are views illustrating a method for manufacturing the dump body according to the first embodiment.
Figure 8:
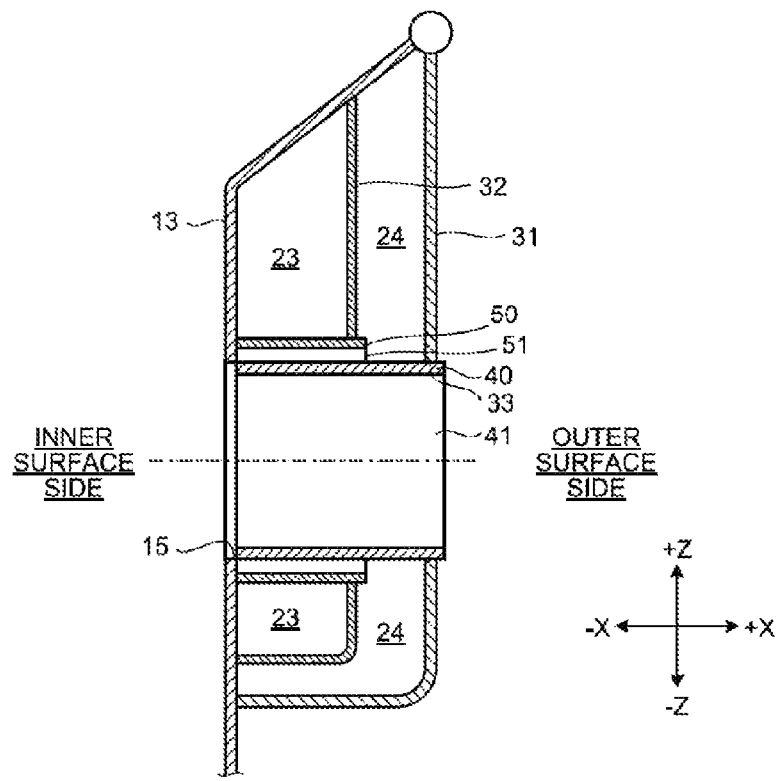

Next, a method for manufacturing the dump body 10 according to the present embodiment will be described. Each of FIG. 6(A) and FIG. 6(B), 7(A) and FIGS. 7(B), and 8(A) and FIG. 8(B) is a view illustrating the method for manufacturing the dump body 10 according to the present embodiment. Each of FIGS. 6(A), 7(A), and 8(A) is a view of a part of the dump body 10 viewed from the +X side in a manufacturing process of the dump body 10. Each of FIGS. 6(B), 7(B), and 8(B) is a cross-sectional view illustrating a part of the dump body 10 in the manufacturing process corresponding to each of FIGS. 6(A), 7(A), and 8(A) and corresponds to a cross-sectional view taken along the line C-C.

As illustrated in FIG. 6(A) and FIG. 6(B), the heat insulation member 50 is arranged on the outer surface side of the side plate 13. The end portion on the inner surface side of the heat insulation member 50 and the outer surface of the side plate 13 are fixed. The end portion on the inner surface side of the heat insulation member 50 is connected to the outer surface of the side plate 13 by welding. The heat insulation member 50 is fixed to the side plate 13 such that a center of the opening 15 coincides with the center of the through-hole 51 in the plane orthogonal to the central axis of the heat insulation member 50.

As illustrated in FIG. 7(A) and FIG. 7(B), the partition plate 32, the side plate 13, and the heat insulation member 50 are fixed after the heat insulation member 50 and the side plate 13 are fixed to each other. The partition plate 32 is fixed to the side plate 13 such that the heat insulation member 50 is arranged in the opening 34. The outer circumferential surface of the heat insulation member 50 and the inner circumferential surface of the opening 34 of the partition plate 32 are connected by welding. The upper end portion of the partition plate 32 and the side plate 13 are connected by welding, and the lower end portion of the partition plate 32 and the side plate 13 are fixed by welding.

As illustrated in FIG. 8(A) and FIG. 8(B), after the partition plate 32, the side plate 13, and the heat insulation member 50 are fixed, the suspension member 40 is arranged in the through-hole 51 of the heat insulation member 50, and the end portion on the inner surface side of the suspension member 40 and the outer surface of the side plate 13 are fixed to each other. The end portion on the inner surface side of the suspension member is connected to the outer surface of the side plate 13 by welding. The suspension member 40 is fixed to the side plate 13 such that the center of the opening 15 coincides with the center of the through-hole 41 in the plane orthogonal to the central axis of the suspension member 40.

In addition, the exterior plate 31 and the side plate 13, and the suspension member 40 are fixed. The exterior plate 31 is fixed to the side plate 13 such that the suspension member 40 is arranged in the opening 33. The outer circumferential surface of the suspension member and the inner circumferential surface of the opening 33 of the exterior plate 31 are connected by welding. The upper end portion of the exterior plate 31 and the side plate 13 are connected by welding, and the lower end portion of the exterior plate 31 and the side plate 13 are connected by welding.

[Operation]

Next, an operation of the dump body 10 will be described. When the engine 6 is driven, exhaust gas is discharged from the engine 6. The exhaust gas discharged from the engine 6 is supplied to the inlet port 21 via the conduit provided in the vehicle body 2. The exhaust gas flows into the flow path 23 via the inlet port 21.

At least a part of the exhaust gas supplied to the inlet port 21 flows through the first flow path 23A. In the first flow path 23A, the exhaust gas flows from the front end portion to the rear end portion of the first flow path 23A. An arrow in FIG. 5 conceptually illustrates how the exhaust gas flows. As illustrated in FIG. 5, the exhaust gas flowing through the first flow path 23A contacts the heat insulation member 50 but does not contact the suspension member 40.

The heat insulation member 50 is arranged to be away from the suspension member 40 without contacting the suspension member 40. The space between the outer circumferential surface of the suspension member 40 and the inner circumferential surface of the heat insulation member 50 is filled with air. The air between the suspension member 40 and the heat insulation member 50 functions as a heat insulating layer S. Thus, even when the heat insulation member 50 contacts the exhaust gas so that the heat insulation member 50 is heated, heat conduction from the heat insulation member 50 to the suspension member 40 is suppressed, and a temperature rise of the suspension member 40 is suppressed.

In addition, the heat insulation member 50 and the partition plate 32 are away from the exterior plate 31. A space 24 among the heat insulation member 50, the suspension member 40, and the partition plate 32 and the exterior plate 31 is filled with air. The air among the heat insulation member 50, the suspension member 40, and the partition plate 32 and the exterior plate 31 functions as a heat insulating layer. Thus, even when the heat insulation member 50 and the partition plate 32 contact the exhaust gas so that the heat insulation member 50 and the partition plate 32 are heated, heat conduction from the heat insulation member 50 and the partition plate 32 to the exterior plate 31 is suppressed, and a temperature rise of the exterior plate 31 is suppressed.

[Effect]

As described above, the heat insulation member 50, which suppresses the contact between the exhaust gas and the suspension member 40 when both the flow path 23 of the exhaust gas and the suspension member 40 are provided in the upper end portion of the side plate 13 forming a part of the dump body 10, is provided in the upper end portion of the side plate 13 according to the present embodiment. The temperature rise of the suspension member 40 caused by the heat of the exhaust gas is suppressed by the heat insulation member 50. Thus, the temperature rise of the exterior plate 31 fixed to the suspension member 40 is suppressed. The temperature rise of the exterior plate 31 forming the surface of the dump body 10 is suppressed, and discoloration of the exterior plate 31 is suppressed, and thus, deterioration of an appearance of the dump body 10 caused by the heat of the exhaust gas is suppressed.

The heat insulation member 50 is away from the exterior plate 31 toward the inner surface side in the present embodiment. As a result, the heat of the heat insulation member 50 is prevented from being directly conducted to the exterior plate 31.

The heat insulation member 50 is arranged around the suspension member 40 in the present embodiment. As a result, the contact between the exhaust gas and the suspension member 40 is suppressed.

The heat insulation member 50 is arranged to be away from the suspension member 40 without contacting the suspension member 40 in the present embodiment. As a result, the heat of the heat insulation member 50 is prevented from being directly conducted to the suspension member 40.

[Modification]

Incidentally, the end portion on the inner surface side of the heat insulation member 50 is fixed to the outer surface of the side plate 13 in the present embodiment. The end portion on the inner surface side of the heat insulation member 50 is not necessarily fixed to the side plate 13. The end portion on the inner surface side of the heat insulation member 50 and the outer surface of the side plate 13 are not necessarily fixed to each other as long as the outer circumferential surface of the heat insulation member 50 and the inner circumferential surface of the opening 34 of the partition plate 32 are fixed and the heat insulation member 50 is fixed to the side plate 13 via the partition plate 32.

Incidentally, the air between the outer circumferential surface of the suspension member 40 and the inner circumferential surface of the heat insulation member 50 functions as the heat insulating layer S in the present embodiment. A heat insulating material having a lower thermal conductivity than the heat insulation member 50 may be arranged as the heat insulating layer S between the outer circumferential surface of the suspension member 40 and the inner circumferential surface of the heat insulation member 50. Examples of the heat insulating material include ceramics.

Incidentally, the heat insulation member 50 is the cylindrical member in the present embodiment. The heat insulation member 50 may be a prismatic member. In addition, the through-hole 51 is formed in the circular shape in the plane orthogonal to the central axis of the heat insulation member 50. The through-hole 51 may be formed in a rectangular shape or an elliptical shape in the plane orthogonal to the central axis of the heat insulation member 50.

Second Embodiment

A second embodiment will be described. Constituent elements that are the same as those in the above-described embodiment will be denoted by the same reference numerals, and the description thereof will be simplified or omitted in the following description.

Figure 9:
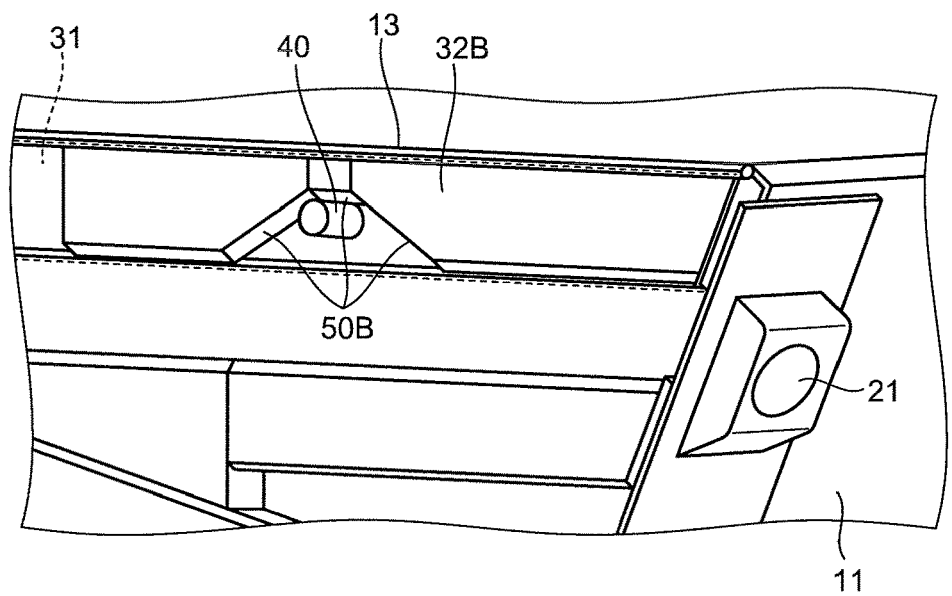
FIG. 9 is a perspective view illustrating a part of a dump body according to a second embodiment.
Figure 9:
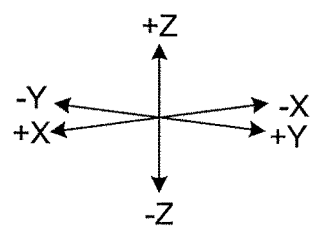

FIG. 9 is a perspective view illustrating a part of the dump body 10 according to the present embodiment. In FIG. 9, the exterior plate 31 is indicated by an imaginary line (dotted line). In the above embodiment, the heat insulation member 50 is the cylindrical member and is arranged around the suspension member 40. As illustrated in FIG. 9, a heat insulation member 50B may be arranged in a part of the periphery of the suspension member 40. In the example illustrated in FIG. 9, the heat insulation member 50B is arranged on the inlet port 21 side (+Y side) of the suspension member 40, the upper side (+Z side) of the suspension member 40, and the exhaust port 22 side (−Y side) of the suspension member 40 but is not arranged on the lower side (−Z side) of the suspension member 40. That is, the heat insulation member 50B is arranged in the periphery of the suspension member 40 except for the side on the −Z direction. In addition, a member on the inlet port 21 side (+Y side), which is a part of the heat insulation member 50B, is arranged on the upstream side of the suspension member 40 in the flow path 23. A partition plate 32B is fixed to the heat insulation member 50B. The flow path 23 is defined by the side plate 13, the heat insulation member 50B, and the partition plate 32B.

As described above, a temperature rise of the suspension member 40 caused by heat of an exhaust gas is suppressed by the heat insulation member 50B even in the present embodiment. Thus, the temperature rise of the exterior plate 31 fixed to the suspension member 40 is suppressed. The temperature rise of the exterior plate 31 forming the surface of the dump body 10 is suppressed, and discoloration of the exterior plate 31 is suppressed, and thus, deterioration of an appearance of the dump body 10 caused by the heat of the exhaust gas is suppressed.

Third Embodiment

A third embodiment will be described. Constituent elements that are the same as those in the above-described embodiment will be denoted by the same reference numerals, and the description thereof will be simplified or omitted in the following description.

Figure 10:
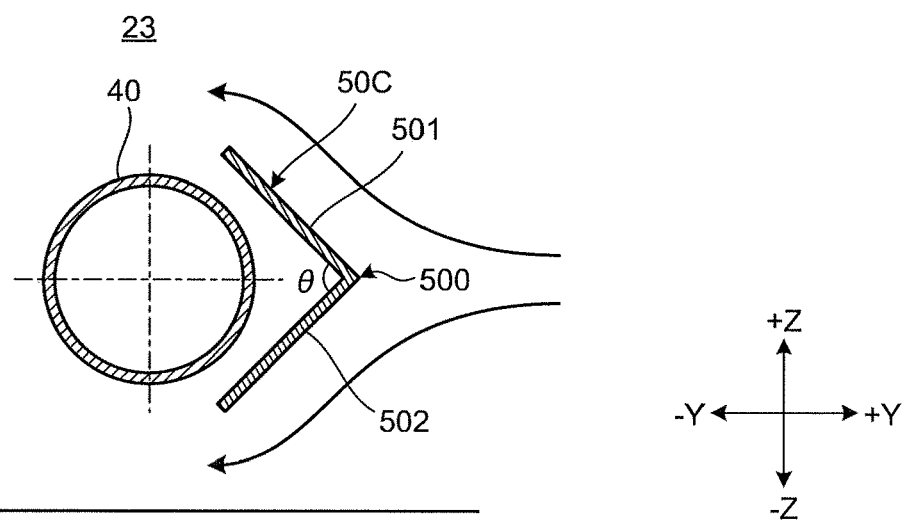
FIG. 10 is a view illustrating a part of a dump body according to a third embodiment.
Figure 10:
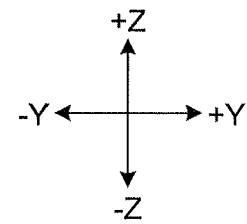

FIG. 10 is a view illustrating a part of the dump body 10 according to the present embodiment. In the above embodiment, the entire suspension member 40 is arranged outside a space forming the flow path 23. As illustrated in FIG. 10, the suspension member 40 may be arranged in the space forming the flow path 23, and at least a part of the suspension member 40 may be arranged so as to be capable of contacting an exhaust gas flowing through the flow path 23. In the example illustrated in FIG. 10, a heat insulation member 50C is arranged on the inlet port 21 side (+Y side) of the suspension member 40 in the flow path 23, that is, on the upstream side in a flow direction of the exhaust gas. The heat insulation member 50C is made of a steel material. The heat insulation member 50C includes a first flat plate 501 and a second flat plate 502 connected to the first flat plate 501. One end portion on the +Y side of the first flat plate 501 and one end portion on the +Y side of the second flat plate 502 are connected. That is, a corner portion 500 of the heat insulation member 50C is formed by the one end portion on the +Y side of the first flat plate 501 and the one end portion on the +Y side of the second flat plate 502. The first flat plate 501 and the second flat plate 502 are arranged such that a distance between the other end portion of the first flat plate 501 and the other end portion of the second flat plate 502 gradually increases toward the −Y side (the downstream side in the flow direction of the exhaust gas). The other end portion of the first flat plate 501 is an end portion on the −Y side opposite to the one end portion of the first flat plate 501 forming the corner portion 500. The other end portion of the second flat plate 502 is an end portion on the −Y side opposite to the one end portion of the second flat plate 502 forming the corner portion 500. The first flat plate 501 and the second flat plate 502 are symmetrically arranged with an angle θ with respect to a symmetry axis parallel to the Y axis. In addition, a position of the corner portion 500 in the Z-axis direction is arranged so as to be at the same position as a center position of the suspension member 40.

An arrow in FIG. 10 conceptually illustrates how the exhaust gas flows. The exhaust gas flowing into the flow path 23 from the inlet port 21 and flowing through the flow path 23 flows to the downstream side along a surface of the first flat plate 501 and a surface of the second flat plate 502. The exhaust gas flows to be away from the suspension member 40. The heat insulation member 50C is arranged so as to cover a portion on the +Y side of the suspension member 40, the portion easily heated due to positive contact with a high-temperature exhaust gas while allowing the exhaust gas flowing through the flow path 23 to be capable of contacting a part on the −Y side of the suspension member 40. That is, at least a part of the heat insulation member 50C is arranged on the upstream side of the suspension member 40 in the flow path 23. Therefore, the heat insulation member 50C prevents the suspension member 40 from being hit by the exhaust gas and heated.

As described above, a temperature rise of the suspension member 40 caused by the exhaust gas is suppressed by a heat-shielding function of the heat insulation member 50C and a flow-regulating function of the exhaust gas even when at least a part of the suspension member 40 is arranged in the space forming the flow path 23 according to the present embodiment. Thus, heat conduction to the exterior plate 31 fixed to the suspension member 40 is suppressed, and a temperature rise of the exterior plate 31 is suppressed.

Other Embodiments

In the above embodiments, the suspension member 40 is provided in each of the first opening 15A, the second opening 15B, the third opening 15C, and the fourth opening 15D. That is, the suspension member 40 is provided at a plurality of positions between the inlet port 21 and the exhaust port 22 of the flow path 23. The heat insulation member 50 (50B or 50C) described in the above embodiments may be provided at each place of the suspension member 40 of the first opening 15A, the suspension member 40 of the second opening 15B, the suspension member 40 of the third opening 15C, and the suspension member 40 of the fourth opening 15D.

A temperature of an exhaust gas flowing through the flow path 23 decreases as a distance from the inlet port 21 increases. Thus, there is a high possibility that a temperature rise of the suspension member 40 arranged in the flow path 23 far from the inlet port 21 is suppressed. Therefore, the heat insulation member 50 (50B or 50C) may be provided at a place where there is the suspension member (the suspension member 40 of the first opening 15A) closest to the inlet port 21 among the plurality of suspension members 40, and is not necessarily provided at a place where there is the suspension member 40 (the suspension member 40 of the fourth opening 15D) farthest from the inlet port 21. Further, the heat insulation member 50 (50B or 50C) may be provided at the place where there is the suspension member 40 of the first opening 15A and is not necessarily provided at each place of the suspension member 40 of the second opening 15B, the suspension member 40 of the third opening 15C, and the suspension member 40 of the fourth opening 15D. The flow path 23 is defined between the side plate 13 and the exterior plate 31 at the place where the heat insulation member 50 (50B or 50C) is not provided. The suspension member 40 at the place where the heat insulation member 50 (50B or 50C) is not provided is fixed to the side plate 13 and the exterior plate 31 in a state where at least a part of the suspension member 40 is arranged in the flow path 23. Even if the suspension member 40 is arranged inside the space forming the flow path 23, discoloration of the exterior plate 31 is suppressed when the temperature of the exhaust gas flowing through the flow path 23 is low.

Incidentally, the suspension member 40 is the cylindrical member in the above embodiments. The suspension member 40 may be a square tubular member. In addition, the through-hole 41 is formed in the circular shape in the plane orthogonal to the central axis of the suspension member 40. The through-hole 41 may be formed in a rectangular shape or an elliptical shape in the plane orthogonal to the central axis of the suspension member 40.

Incidentally, the dump truck 1 is assumed to be the rigid frame type in the above embodiments. The dump truck 1 may be an articulated type.

Incidentally, the dump truck 1 is assumed to be a rear dump type in the above embodiment. The dump truck 1 may be a side dump type in which a cargo is discharged from the dump body 10 by tilting the dump body 10 to the left or right.

REFERENCE SIGNS LIST

1 DUMP TRUCK
2 VEHICLE BODY

3 TRAVELING DEVICE
4 WHEELS
4F FRONT WHEEL
4R REAR WHEEL
5 TIRE
5F FRONT TIRE
5R REAR TIRE
6 ENGINE
7 HOIST CYLINDER
8 BRACKET
9 ROTATION PIN
10 DUMP BODY
11 FRONT PLATE
12 BOTTOM PLATE
13 SIDE PLATE
13R RIGHT SIDE PLATE
13L LEFT SIDE PLATE
14 PROTECTOR PLATE
15 OPENING
15A FIRST OPENING
15B SECOND OPENING
15C THIRD OPENING
15D FOURTH OPENING
21 INLET PORT
22 EXHAUST PORT
23 FLOW PATH
23A FIRST FLOW PATH
23B SECOND FLOW PATH
23C THIRD FLOW PATH
23D FOURTH FLOW PATH
23E FIFTH FLOW PATH
23F SIXTH FLOW PATH
23G SEVENTH FLOW PATH
24 SPACE
31 EXTERIOR PLATE
32 PARTITION PLATE
32B PARTITION PLATE
33 OPENING
34 OPENING
40 SUSPENSION MEMBER
41 THROUGH-HOLE
50 HEAT INSULATION MEMBER
50B HEAT INSULATION MEMBER
50C HEAT INSULATION MEMBER
51 THROUGH-HOLE
500 CORNER PORTION
501 FIRST FLAT PLATE
502 SECOND FLAT PLATE
FX ROTATION AXIS
L1 BENT PORTION
L2 BENT PORTION
L3 BENT PORTION
RX ROTATION AXIS
S HEAT INSULATING LAYER

The invention claimed is:

1. A dump body comprising:
a side plate;
an exterior plate which is arranged on an outer surface side of the side plate;
a suspension member which is fixed to the side plate and has a through-hole connecting a space on an inner surface side of the side plate and a space on an outer surface side of the exterior plate;
a flow path which is defined in at least a part between the side plate and the exterior plate and through which an exhaust gas of an engine flows; and
a heat insulation member arranged between the side plate and the exterior plate, the heat insulation member being configured to suppress contact between the exhaust gas and the suspension member.

2. The dump body according to claim 1, wherein the heat insulation member is away from the exterior plate toward an inner surface side.

3. The dump body according to claim 1, wherein at least a part of the heat insulation member is arranged on an upstream side of the suspension member in the flow path.

4. The dump body according to claim 1, wherein the heat insulation member is arranged around the suspension member.

5. The dump body according to claim 1, wherein the heat insulation member is away from the suspension member.

6. The dump body according to claim 1, further comprising a heat insulating layer between the suspension member and the heat insulation member.

7. The dump body according to claim 1, further comprising a partition plate which is fixed to the heat insulation member and arranged between the side plate and the exterior plate,
wherein the flow path is defined by the side plate, the heat insulation member, and the partition plate.

8. The dump body according to claim 7, wherein the partition plate is away from the exterior plate toward the inner surface side.

9. The dump body according to claim 1, further comprising:
an inlet port configured to introduce the exhaust gas into the flow path; and
an exhaust port configured to discharge the exhaust gas from the flow path,
wherein a plurality of the suspension members is provided between the inlet port and the exhaust port, and
the heat insulation member is provided in the suspension member closest to the inlet port.

10. A dump truck comprising:
the dump body according to claim 1; and
a vehicle body supporting the dump body.

* * * * *